United States Patent
Gattus et al.

[15] 3,671,481
[45] June 20, 1972

[54] TRIMELLAMIDE-IMIDES SOLUTIONS

[72] Inventors: Jean Gattus, La Mulatiere; Maurice Mallet, Lyon, both of France

[73] Assignee: Rhone-Poulenc S.A., Paris, France

[22] Filed: July 2, 1970

[21] Appl. No.: 52,072

[30] Foreign Application Priority Data

July 4, 1969 France ..................................6922817

[52] U.S. Cl. .................260/30.2 R, 260/32.6 N, 260/47 CZ, 260/78 TF
[51] Int. Cl. ......................................................C08g 51/44
[58] Field of Search..............260/32.6 N, 30.2, 78 TF, 47 CZ

[56] References Cited

UNITED STATES PATENTS

| | | | |
|---|---|---|---|
| 3,428,486 | 2/1969 | George | 117/218 |
| 3,320,202 | 3/1967 | Bolton et al. | 260/30.2 |
| 3,260,691 | 7/1966 | Lavin et al. | 260/30.2 |
| 3,546,152 | 12/1970 | Bolton | 260/29.2 |
| 3,355,427 | 11/1967 | Loncrini | 260/47 |
| 3,179,634 | 4/1965 | Edwards | 260/78 |

*Primary Examiner*—Morris Liebman
*Assistant Examiner*—Richard Zaitlen
*Attorney*—Stevens, Davis, Miller & Mosher

[57] ABSTRACT

Solutions of trimellamide-imides in non-hydroxylic polar solvents containing an aromatic anhydride and an aromatic diamine are useful for making films which can be easily detached from metallic supports.

7 Claims, No Drawings

TRIMELLAMIDE-IMIDES SOLUTIONS

The present invention provides solutions based on trimellamide-imides, which are particularly suitable for the formation of films.

Trimellamide-imides posses the valuable property of adhering to metals, and this has been utilized for obtaining insulating coatings on metallic conductors.

This property becomes a handicap if, in order to prepare films of relatively large size, plane metallic surfaces are used as a support, because it is difficult to separate the films from their support without affecting their properties or causing them to break.

The present invention provides solutions based on trimellamide-imies which can be used to form films which can be easily detached from metallic supports on which they have been formed.

These new solutions are solutions of aromatic trimellamide-imides in a nonhydroxylic polar organic solvent, comprising at least 0.5 percent by weight of an anhydride of an aromatic dicarboxylic to tetracarboxylic acid and at least 0.5 percent by weight of a di-primary aromatic diamine, both percentages being based on the weight of trimellamide-imide.

Especially suitable trimellamide-imides are those which are obtainable by the reaction of trimellitic anhydride with a compound of the formula:

$$X - A - X \quad (I)$$

in which A is a divalent radical containing at least one benzene nucleus, such as n-phenylene, p-phenylene, p,p'-di-phenylene or

where B is a divalent group such as —O—, —CH$_2$—, —C(CH$_3$)$_2$— or —SO$_2$—, and X is —NCO or —NHCOOR in which R is alkyl of one to six carbon atoms, phenyl, or methylphenyl.

Suitable solvents are, for example, N-methyl-pyrrolidone, dimethylformamide, dimethylacetamide, dimethylsulphoxide and N-methylcaprolactam. It is advantageous to prepare the trimellamide-imide in the solvent chosen for the preparation of the solutions of the invention.

The preparation of the trimellamide-imide can be effected by applying processes such as those described in French Patent No. 1,473,600 and in Dutch Application No. 68-10 941. The solutions obtained can optionally be diluted or concentrated to the desired absolute viscosity, which is generally 500 to 2000 poises at 25° C. Among these solutions, those in which the trimellamide-imide has a reduced viscosity of from 0.8 to 1.8 dl/g (measured in a 0.5 percent solution in N-methylpyrrolidone) are preferred. Solutions in N-methylpyrrolidone wherein the trimellamide-imide is derived from 4,4'-diisocyanato-diphenylmethane or 4,4'-diisocyanato-diphenyl ether are particularly suitable.

The aromatic anhydrides used in the solutions of the invention can be monoanhydrides such as those of the formula

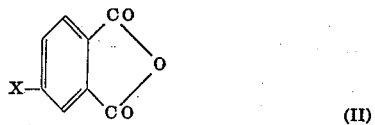

in which the symbol X is hydrogen,

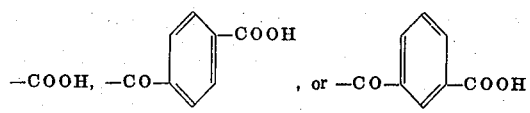

Among these monoanhydrides, phthalic anhydride, benzophenone-3,4,4'-tricarboxylic anhydride and trimellitic anhydride are especially suitable. It is also possible to use dianhydrides such as pyromellitic anhydride or a dianhydride of the formula:

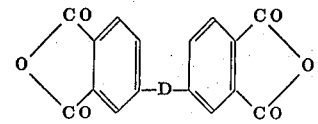

in which D is a diavlent radical such as

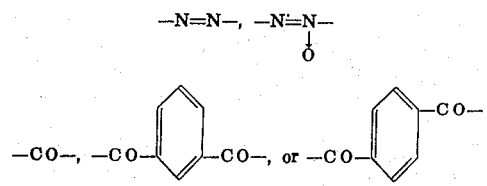

Among these latter dianhydrides, azophthalic anhydride, the dianhydride of benzophenone-3,3', 4,4'-tetracarboxylic acid, azoxyphthalic anhydride and the dianhydrides of m- or p-bis(3,4-dicarboxybenzoyl)benzene are particularly suitable.

Suitable aromatic di-primary diamines which can be used with the anhydrides, are the compounds of formula $$H_2N - A - NH_2 \quad (IV)$$

in which A is as hereinbefore defined. 4,4'-Diamino-diphenyl ether, 4,4'-diamino-diphenylmethane and m-phenylenediamine are particularly suitable.

To prepare the solutions of the invention, it is possible to add the anhydride and the diamine gradually to the solution of trimellamide-imide at ordinary temperature (25° C.) and then to stir the whole until a homogeneous solution is obtained. Preferably however, the anhydride and the diamine are dissolved beforehand in a polar solvent such as one of those which have been mentioned earlier, and the solution obtained is then gradually added to the solution of trimellamide-imide with stirring.

The preferred proportions of anhydride and diamine are from 1 percent by weight upwards, relative to the weight of trimellamide-imide. There is no essential upper limit but for economic reasons, proportions less than 3percent are generally used.

The Examples which follow illustrate the invention.

EXAMPLE 1 a. A solution prepared by adding 1.75 g. of trimellitic anhydride and 1.75 g. of 4,4'-diamino-diphenyl ether to 36.5 g. of N-methylpyrrolidone is added gradually and with stirring to 1,000 g. of a solution (S) of trimellamideimide obtained by the reaction of trimellitic anhydride and 4,4'-diisocyanato-diphenyl ether in N-methylpyrrolidone.

A part of the resulting solution of cast as a thin film on a 180 mm. wide stainless steel plate. The whole is then heated for 40 minutes in a ventilated chamber kept at 100° C. After cooling, the thickness of the film on its support is measured, and is found to be 90 μ.

The force required to detach the film from its support over its entire width is measured with a recording tensometer of the "AMSLER" type, the speed of detachment being 180 mm/minute. It is found that this force retains a practically constant value with time, and is about 50 g.

b. If the initial solution is prepared with 3.5 g. of trimellitic anhydride and 3.5 g. of 4,4'-diaminodiphenyl ether, the detachment force is again practically constant and is about 60 g.

c. By way of comparison, if a film is prepared from the solution (S) of trimellamide-imide by itself under otherwise identical conditions, the force required for detachment is large and fluctuates between 2,000 and 5,000 g.

The solution (S) of trimellamide-imide as prepared from 192 g. of trimellitic anhydride and 252 g. of 4,4'-diisocyanato-diphenyl ether in 1,036 g. of N-methyl-pyrrolidone. The solution was gradually heated to 180° C. and then diluted with 700 g. of N-methylpyrrolidone. The final solution was heated to 180° C. until it had an absolute viscosity of 1,400 poises at 25° C. This solution contains 17.6 percent by weight of trimellamide-imide having a reduced viscosity at 25° C. of 1.4 dl/g. (measured in an 0.5 percent strength solution in N-methylpyrrolidone).

EXAMPLE 2 a. A solution prepared by adding 1.75 g. of pyromellitic anhydride and 1.75 g. of 4,4'-diamino-diphenyl-ether to 35 g. of N-methylpyrrolidone is added gradually, with stirring, to 1,000 g. of the solution (S) of tri-mellamide-imide described in Example 1.

A film is prepared with part of this solution in the manner described in Example 1, the detachment force for this film being about 300 to 400 g.

b. If the initial solution is prepared with 3.5 g. of pyromellitic anhydride and 3.5 g. of 4,4'-diamino-diphenyl-ether, the detachment force is about 175 g. and is practically constant.

WE CLAIM:

1. A solution of an aromatic trimellamide-imide obtained by the addition of 1 to 3 percent by weight of an anhydride of a dicarboxylic to tetracarboxylic aromatic acid and 1 to 3 percent by weight of an aromatic diprimary diamine, both percentages being based on the weight of trimellamide-imide, to a solution in a non-hydrolytic polar organic solvent of an aromatic trimellamide-imide prepared by the reaction of trimellitic anhydride with a compound of the formula $$X - A - X$$

in which A is m-phenylene, p-phenylene, p,p'-biphenylene or $$-\langle\phantom{x}\rangle-B-\langle\phantom{x}\rangle-$$

where B is —O—, —CH$_2$—, —C(CH$_3$)$_2$— or —SO$_2$—, and X is —NCO or —NHCOOR, in which R is alkyl of 1 to 6 carbon atoms, phenyl, or methylphenyl.

2. A solution according to claim 1, in which the said solvent is N-methylpyrrolidone.

3. A solution according to claim 1, in which the said anhydride of an aromatic acid has the formula:

in which X is hydrogen, —COOH,

—CO—⟨⟩—COOH , or —CO—⟨⟩—⟨⟩—COOH

4. A solution according to claim 1, in which the said anhydride of an aromatic acid is pyromellitic dianhydride or a dianhydride of the formula:

in which D is

—N=N—, —N=N→O, —CO—

—CO—⟨⟩—CO—, or —CO—⟨⟩—⟨⟩—CO—

5. A solution according to claim 1, in which the said aromatic diprimary diamine has the formula:

$$H_2N - A - NH_2$$

in which A is m-phenylene, p-phenylene, p,p'-biphenylene, or $$-\langle\phantom{x}\rangle-B-\langle\phantom{x}\rangle-$$

where B is —O—, —CH$_2$—, —C(CH$_3$)$_2$—, or —SO$_2$—.

6. A solution according to claim 1, in which the trimellamide-imide has a reduced viscosity of from 0.8 to 1.8 dl/g., measured on a 0.5 percent solution in N-methylpyrrolidone, and the solution has an absolute viscosity of 500 to 2,000 poises.

7. Process for the preparation of a self-supporting film which comprises casting on a metallic support a layer of a solution as defined in claim 1, evaporating the solvent to produce a self-supporting film, and detaching the film so produced from the support.

* * * * *